United States Patent [19]

Armstrong et al.

[11] Patent Number: 4,568,422
[45] Date of Patent: Feb. 4, 1986

[54] SYSTEM FOR RECOVERING HEAT IN AN ALKALINE PULP DIGESTING PROCESS

[75] Inventors: A. Douglas Armstrong, Duluth; Vernon B. Bodenheimer, Dunwoody, both of Ga.; Tom O. Rytter, Crossett, Ark.

[73] Assignee: Georgia-Pacific Corporation, Atlanta, Ga.

[21] Appl. No.: 537,360

[22] Filed: Sep. 29, 1983

Related U.S. Application Data

[62] Division of Ser. No. 328,528, Dec. 8, 1981, Pat. No. 4,421,597.

[51] Int. Cl.⁴ .................. D21C 7/12; D21C 11/06
[52] U.S. Cl. ...................... 162/238; 162/239
[58] Field of Search ............ 162/52, 68, 47, 49, 162/15, 46, 61, 239, 241, 242, 249, 250, 238, 246

[56] References Cited

U.S. PATENT DOCUMENTS

| | | | |
|---|---|---|---|
| 1,645,754 | 10/1927 | Howell, Jr. | 162/46 |
| 1,648,111 | 11/1927 | Collins | 162/29 |
| 1,885,561 | 11/1932 | Stevens et al. | 162/47 |
| 2,038,780 | 1/1936 | Adams et al. | 162/46 |
| 2,041,597 | 5/1936 | Dunbar | 162/42 |
| 2,152,267 | 3/1939 | Merrill | 162/61 |
| 2,195,378 | 3/1940 | Dunbar | 162/30.1 |
| 2,205,374 | 6/1940 | Dunbar | 162/41 |
| 2,808,234 | 10/1957 | Rosenblad | 165/34 |
| 2,824,800 | 2/1958 | Rosenblad | 162/47 |
| 2,859,108 | 11/1958 | Rosenblad | 162/83 |
| 2,886,483 | 5/1959 | Rosenblad | 162/42 |
| 2,999,785 | 9/1961 | Richter et al. | 162/60 |
| 3,183,145 | 5/1965 | Collins, Jr. | 162/47 |
| 3,313,680 | 4/1967 | Hoar | 162/47 |
| 3,325,970 | 6/1967 | Axelsson | 55/48 |
| 3,530,034 | 9/1970 | Erickson | 162/19 |
| 3,814,662 | 6/1974 | Starrett | 162/19 |
| 4,138,311 | 2/1979 | Neno | 162/52 |
| 4,274,911 | 6/1981 | Kroneld et al. | 162/47 |

FOREIGN PATENT DOCUMENTS 1049713 1/1979 Canada .................. 162/47

*Primary Examiner*—Steve Alvo
*Attorney, Agent, or Firm*—Banner, Birch, McKie & Beckett

[57] ABSTRACT

A system for recovering heat in a pulp digesting process is disclosed. The system includes apparatus for blowing a pulp and liquid mixture from a digester to a container such as a blow tank or blow cyclone; a conduit for transferring flash vapor above a predetermined pressure, which is above atmospheric pressure, from the blow tank to a pressure accumulator; a conduit for transferring flash vapor below the predetermined pressure from the blow tank to an atmospheric accumulator.

12 Claims, 3 Drawing Figures

SYSTEM FOR RECOVERING HEAT IN AN ALKALINE PULP DIGESTING PROCESS

This application is a division of application Ser. No. 328,528, filed Dec. 8, 1981, now U.S. Pat. No. 4,421,597, issued Dec. 20, 1983.

TECHNICAL FIELD

The present invention relates to a wood pulp digesting process, and more particularly to a heat recovery system and method wherein pressurized vapor from a blow tank or blow cyclone is used in a pressure controlled manner to mix with and heat a processing liquid, such as white or black liquor or water.

BACKGROUND OF THE INVENTION

Vapors generated in wood pulp digesting processes of the prior art have been used in various manners. For example, the use of vapor from a digester to heat a processing liquid is disclosed in U.S. Pat. Nos. 1,645,754; 2,041,597 and 2,859,108. The system disclosed in the '108 patent is an acid digestion system which additionally utilizes vapor from a blow tank or blow cyclone as a heating medium to indirectly heat the digesting acid.

U.S. Pat. Nos. 3,530,034 and 3,814,662 disclose the use of heated vapor for pre-heating wood chips. In the '662 patent, the heated vapor originates in a blow tank.

U.S. Pat. Nos. 1,648,111 and 2,999,785 disclose other uses of heated vapor issuing from a blow tank. In the '111 patent, the vapor is used to indirectly heat an evaporator. In the '785 patent, the vapor from the blow tank is used to heat pulp that has issued from the blow tank and also to heat wash water within a heat exchanger. U.S. Pat. Nos. 2,808,234 and 3,325,970 disclose condensers for condensing vapor issuing from a blow tank.

While the prior art is replete with numerous uses of heated vapors in pulp digesting processes, it is applicants' belief that the pressure controlled use of vapors from a blow tank or blow cyclone to mix with and heat a processing liquid within a pressure accumulator in an alkaline pulp digesting process has not been attempted.

SUMMARY OF THE INVENTION

The present invention relates to a method for recovering heat in a pulp digesting process. The method is comprised of the steps of: blowing a pulp and liquid mixture from a digester to a container such as a blow tank or blow cyclone; transferring flash vapor above a predetermined pressure, which is above atmospheric pressure, from the container to a pressure accumulator; transferring flash vapor below the predetermined pressure from the blow tank to an atmospheric accumulator; and mixing the flash vapor transferred to the pressure accumulator with a processing liquid at a pressure above atmospheric. The present invention is also directed to a system for recovering heat by the above method.

The processing liquid may be a white liquor, a black liquor, a mixture of white and black liquor, or water.

The present invention allows heat to be captured at a temperature above 200° F. and above atmospheric pressure, thus enabling the energy to be returned to the process hotter than heat at atmospheric pressure, making the recovered heat more useful and valuable.

Various advantages and features of novelty which characterize the invention are pointed out with particularity in the claims annexed hereto and forming a part hereof. However, for a better understanding of the invention, its advantages, and objects attained by its use, reference should be had to the drawings which form a further part hereof and to the accompanying descriptive matter, in which there is illustrated and described several embodiments of the invention.

DETAILED DESCRIPTION OF THE INVENTION

Figure 1:
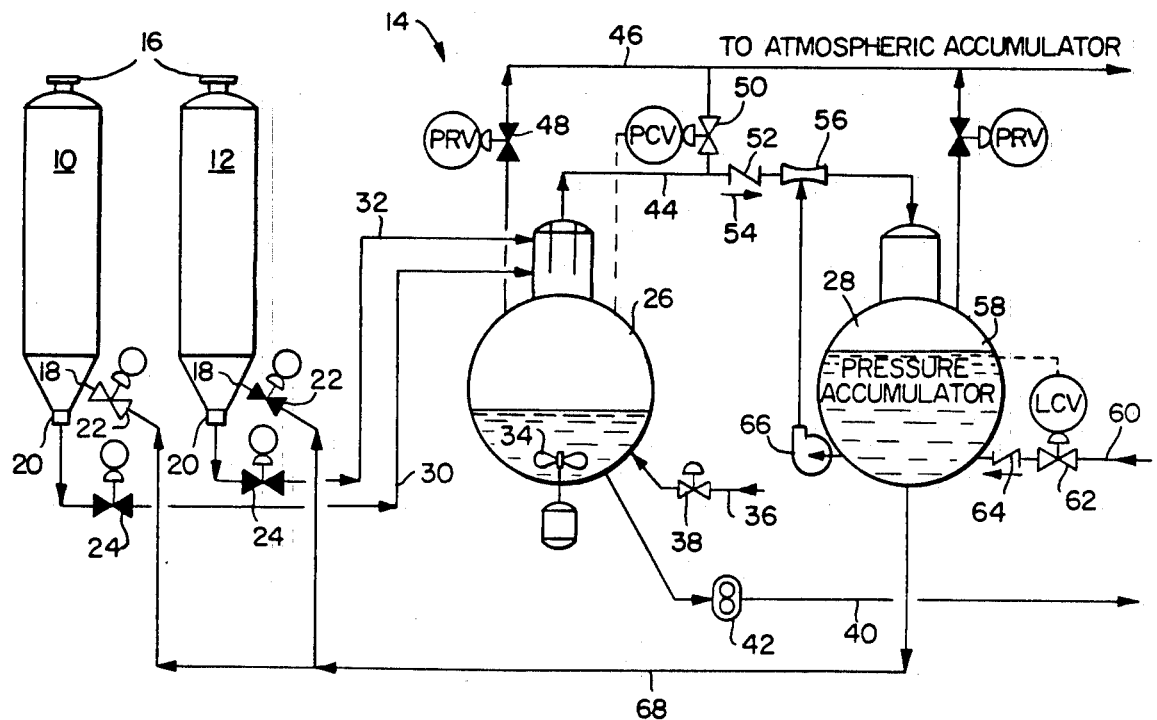
FIG. 1 is a diagram of a first embodiment of a system for recovering heat in a pulp digesting process in accordance with the present invention.

Referring to the drawings in detail, wherein like numerals indicate like elements, there is shown in FIG. 1 a pair of digesters 10, 12 in fluid communication with a heat recovery system 14. Digestors 10, 12 are of conventional design adapted to cook or digest wood pulp in an alkaline pulping process. Each digester 10, 12 has a chip inlet 16, a liquor inlet 18, and an outlet 20. An inlet control valve 22 is disposed at each liquor inlet 18 and an outlet control valve 24 is disposed at each outlet 20.

The heat recovery system includes a receiving container 26 and a pressure accumulator 28 in fluid communication with one another. The container 26 and the pressure accumulator 28 are preferably spherical in configuration. The discharge from digester 10 is blow to container 26 through a conduit 30 controlled by one of the control valves 24, and the contents of digester 12 is blown to container 26 through a conduit 32 controlled by the other control valve 24. The blowing step takes place after the pulp and a liquor have been cooked or digested a sufficient degree in a conventional manner.

The pressure in the container 26 rises above atmospheric pressure as the digested materials are blown into it. The blown material may be agitated within container 26 by a mixer or agitator 34. If an additional liquid is needed in the digested material, a dilution liquid can be injected into the container 26 through a conduit 36, controlled by a control valve 38. As the pulp and liquid are blown into the container 26, the pressure therein rises flash vapor forms in the container and is transferred to the pressure accumulator 28. After flash vapor has been withdrawn from the container 26, in the manner described hereinafter, the digested liquid and pulp can be withdrawn from the container 26 through a conduit 40 by means of a pump 42 and transferred to a conventional leveling tank. The container 26 performs the function of receiving the digested pulp at an elevated temperature and pressure from the digesters 10, 12. The container 26 can be either a conventional blow clyclone or a conventional blow tank. If a blow cyclone is used, vapor is separated from the pulp and the pulp is passed to a blow tank before further processing.

A conduit 44 connects container 26 and accumulator 28, and a conduit 46 connects container 26 to an atmospheric accumulator. Flash vapor of the pulp and liquor mixture exits container 26 through either conduit 44 or conduit 46. Whether flash vapor from the container 26 passes to the atmospheric accumulator or the pressure accumulator 28 is determined by the position of a pressure relief valve 48 and a pressure control valve 50. If the pressure within container 26 is not excessive pressure relief valve 48 remains closed. If the pressure within the container 26 is at or above a first predetermined level, pressure control valve 50 also remains closed. This first predetermined level of pressure is selected such that the temperature and pressure of the vapor in heating a processing liquid 58 in the pressure accumulator is still sufficiently high to be useful. For example the first predetermined level could be as high as 75 psig or as low as 30 psig. In this condition, the flash vapor passes through the conduit 44 into the pressure accumulator 28 through a one-way check valve or an automatically controlled block valve 52 and an eductor 56. The check valve 52 permits the flow of vapor only in the direction of arrow 54. As the blow cycle ends and the flash vapor is withdrawn from the container 26, the pressure in the container 26 begins to drop. When the pressure in the container 26 drops below the first predetermined level, the pressure control valve 50 opens and the remaining flash vapor is passed to an atmosphere accumulator, i.e., a device which functions as a heat recovery process at atmospheric pressure, for example, the heating process water or a heat evaporator.

If the pressure in container 26 is above a second predetermined level, a level above the pressure desired in pressure accumulator 28, pressure control valve 50 remains closed and pressure relief valve 48 opens to allow the flash vapor to vent to the atmospheric accumulator.

The liquid 58 is injected into the pressure accumulator 28 through a conduit 60 controlled by a level control valve 62 and a one-way check valve 64. The liquid is preferably supplied to the pressure accumulator at an elevated temperature and the mixing with the flash vapor raises the temperature of the liquid even further. The liquid 58 within the pressure accumulator 28 is preferably circulated through the eductor 56 and the conduit 44 by means of a pump 66 while the flash vapor is passing therethrough. In this manner, the flash vapor can mix with and condense into the processing liquid 58 as it passes through the eductor 54. As the processing liquid and condensed flash vapor enter the pressure accumulator 28, the pressure therein rises. When the pressure in the container 26 falls below the first predetermined level and the valve 50 opens, the check valve 52 prevents the reverse flow of any flash vapor or liquid in the pressure accumulator 28 and the accumulator is maintained at above atmospheric pressure, generally near the first predetermined pressure level.

The liquid 58 may be either a white liquor, a black liquor or a mixture of a white liquor and a black liquor for use in the digestion process. The liquor, once it has been heated by the vapor from the container 26 can be injected into either the digester 10 or the digester 12 through a conduit 68 under the control of the control valves 22.

The heat recovery system 14 typically operates in the following manner. One of the digesters 10, 12 blows into the container 26. Flash vapor of the liquid and pulp forms in the container 26 and the pressure therein rises. Flash vapor down to the first predetermined pressure level is directed from the container 26 to the pressure accumulator 28 through conduit 44. A portion of the liquid in the pressure accumulator 28 is circulated through the eductor 56 and the flash vapor condenses with liquid passing therethrough. The liquid and condensed vapors then pass into the pressure accumulator and the pressure therein rises. When the pressure in the container 26 drops below the first predetermined level the pressure control valve 50 opens and relieves the remaining flash vapor to the atmospheric accumulator. The check valve 52 prevents the pressure accumulated in the pressure accumulator 28 from relieving back into the circuit 46 or the container 26. When the blow is finished and the pressure drops to atmospheric, the pressure control valve 50 closes and is ready for another blow. When one of the digesters 10, 12 is ready to be charged with cooking liquor, one of the valves 22 is opened at the respective digester and the pressure from the accumulator 28 forces the liquid 58, i.e., a liquor, into one of the digesters at a elevated temperature.

Several examples of a process utilizing the system illustrated in FIG. 1 are as follows. Digester 10 is at approximately 110 psig when the associated valve 24 opens to initiate a blow to container 26. As the pulp and liquor mixture blows to tank 26, the pressure in the tank 26 begins to rise and flash vapor begins to form. The pressure control valve 50 is set at 45 psig (approximately 293° F.) so that all the flash vapor down to 45 psig is transferred to the pressure accumulator 28. A quantity of white liquor at a temperature of approximately 170° F. has been supplied to the pressure accumulator 28. Pump 66 is activated during the transfer of flash vapor to circulate the white liquor through the eductor 56 where it condenses the flash vapor and is returned to the pressure accumulator 28. The temperature of the white liquor in the pressure accumulator 28 is thereby raised to approximately 293° F. and the pressure in the pressure accumulator 28 is raised to approximately 42 to 44 psig. When digestor 10 or 12 is to be charged, the associated valve 22 is opened and the pressurized, heated white liquor flows to the pressure accumulator, thereby becoming partially evacuated and the temperature of any remaining white liquor drops about 1° F. to 292° F.

Another example of a process utilizing the system of FIG. 1 is similar to the first example, except for certain operating tempratures and pressures. In this example, either a white liquor or a black liquor is heated. Pressure control valve 50 is set for 40 psig or 287° F. The liquor is heated in the pressure accumulator to about 275° F. or about 30 psig. When a digester is ready to be charged, heated liquor at 30 psig and 275° F. flows to the digester under its own pressure. During the evacuation, the cooling liquor temperature drops to approximately 274° F.

Figure 2:
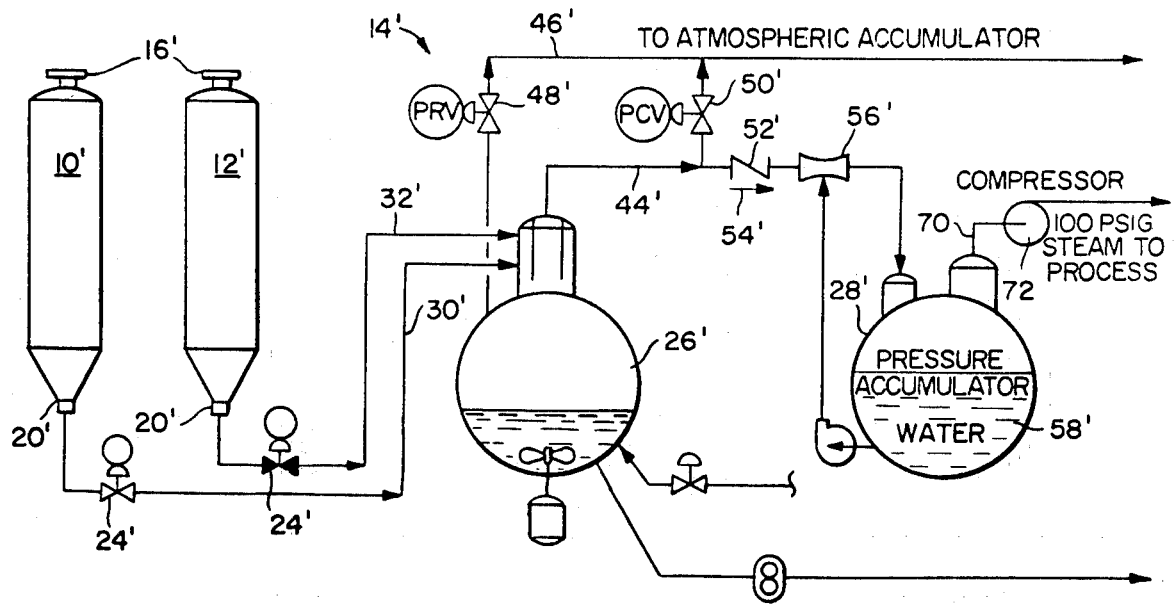
FIG. 2 is a diagram of a second embodiment of a system in accordance with the present invention.

A second embodiment of a heat recovery system, designated generally as 14' is shown in FIG. 2. Elements of the system 14', which are similar to elements of the system 14 will be indicated by like primed numerals. The heat recovery system 14' is similar to the heat recovery system 14, except for the operation of the pressure accumulator 28'.

The pressure accumulator 28' is designed to hold water which is to be heated by the flash vapor from the container 26'. The heated liquid 58', i.e., the water, is not circulated to the digesters 10', 12'. Rather, flash vapor and steam generated in the pressure accumulator 28' is withdrawn through a conduit 70 for use in other portions of the digesting process or other pulp and paper mill processes or to a low pressure turbine.

The vapor withdrawn from the pressure accumulator 28' may be used at the pressure it exits from the accumulator, or it may be further compressed by a compressor 72.

A example of a process utilizing the system illustrated in FIG. 2 is as follows. The pressure control valve 50' is set for 65 psig or 312° F. When the pressure in the container 26' drops to 65 psig, the valve 50' opens and allows the remaining flash vapor to exit to the atmosphere accumulator. The water in the pressure accumulator 28' is heated and the pressure therein is raised to approximately 60 psig. Flash vapor from the pressure accumulator 28' is withdrawn from the accumulator 58' to the compressor 72 where it is further compressed to approximately 100 psig. The further pressurized vapor is thereafter transferred to a steam header or other process.

Figure 3:
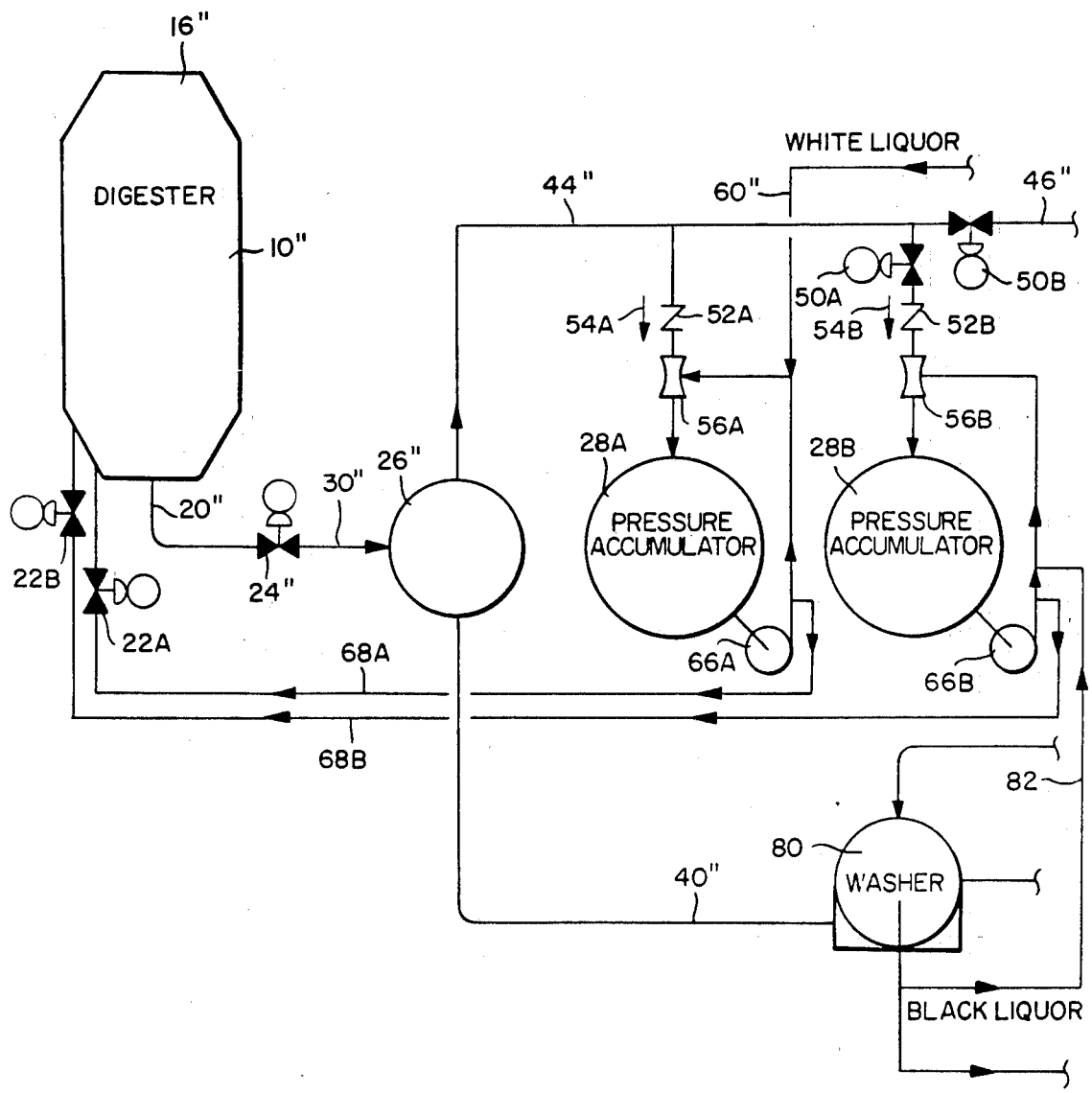
FIG. 3 is a diagram of a third embodiment of a system in accordance with the present invention.

A third embodiment of a heat recovery system, designated generally as 14" is shown in FIG. 3. Elements of the system 14", which are similar to the elements of the system 14, will be indicated by like double primed numerals. The heat recovery system 14" is similar to the heat recovery system 14, except for the use of two pressure accumulators 28a and 28b.

The first processing liquid, i.e., a white liquor, is placed in the first pressure accumulator 28a via an inlet conduit 60". A first pressure accumulator valve 50a is set at a first predetermined pressure level so that flash vapor from the container 26" up to the first predetermined pressure level is directed to the first pressure accumulator 28a through the check valve 52a and the eductor 56a. The white liquor from the first pressure accumulator 28a is circulated through the eductor 56a by the pump 66a to condense the flash vapor with the white liquor.

When the pressure in the container 26" drops below the first predetermined level, the first pressure control valve opens, and a second pressure control valve 50b remains closed. Flash vapor below the first predetermined level is thereby directed to the second pressure accumulator 28b. Pressure accumulator 28b contains a second processing liquid, i.e., black liquor. The black liquor can be supplied to the pressure accumulator 28b from a washer 80 through a conduit 82. Washer 80 is a washer which separates black liquor from the processed pulp and liquor mixture transferred from the container 26". The flash vapor is condensed with the black liquor in the eductor 56b.

When the pressure in the container 26" drops below a second predetermined level, the second pressure control valve 50b opens and the remaining flash vapor is directed to an atmospheric accumulator. When a digester 10" is ready to be charged, the pressurized and heated liquors from pressure accumulators 28a and 28b can be injected through conduit 68a and 68b under the control of valves 22a and 22b respectively.

An example of a process utilizing the system illustrated in FIG. 3 is as follows. The first pressure control valve 50a is set for 50 psig. The white liquor in the first pressure accumulator 28a is heated to approximately 290° F. at 45 psig. When the container pressure drops to 50 psig, valve 50a opens and the flash vapor is directed to the second pressure accumulator 28b. The black liquor contained therein is heated to 270° F. When the container pressure drops to about 30 psig, the second pressure accumulator valve 50b opens and diverts the remaining flash vapor from the container to a conventional pressure accumulator, i.e., conventional heat recovery system operating at atmospheric pressure. The pressure-temperature relationships mentioned above are approximate and will change with the composition of the liquors in the accumulator.

Numerous characteristics and advantages of the invention have been set forth in the forgoing description, together with details of the structure and function of the invention, and the novel features thereof are pointed out in the appended claims. The disclosure, however, is illustrative only and changes may be made in detail especially in matters of shape, size, and arrangement of parts, within the principle of the invention, to the full extent indicated by the broad general meaning of the terms in which the appended claims are expressed.

We claim:

1. A system for recovering heat in an alkaline pulp digesting process comprising:

container means for receiving a pulp and a liquid mixture from a digester whereby the pressure in said container means rises above atmospheric pressure and vapor flashes from the mixture;

pressure accumulator means for receiving flash vapor of said mixture from said container means and for holding a processing liquid into which the flash vapor is to be condensed at a pressure above atmospheric;

first conduit means in fluid communication with an outlet from said container means and an inlet to said pressure accumulator means in fluid communication with one another to carry the flash vapor therebetween;

second conduit means in fluid communication with said first conduit means and an atmospheric accumulator for conducting flash vapor below a predetermined pressure to the atmospheric accumulator;

valve means disposed between the first and second conduit means; and pressure control means for opening and closing said valve means, said pressure control means responsive to the pressure in said container means at or above the predetermined pressure for closing said valve means and directing the flash vapor to said pressure accumulator means, said pressure control means responsive to pressure in said container means below the predetermined pressure for opening said valve means and directing the flash vapor to the atmospheric accumulator.

2. A system in accordance with claim 1 wherein said first conduit means includes valve means for preventing the flow of flash vapor from said pressure accumulator means to said container means wherein the pressure in said pressure accumulator means is maintained above atmospheric.

3. A system in accordance with claim 1 wherein said pressure accumulator means includes processing liquid inlet means for receiving the processing liquid to be mixed with and heated by the flash vapor, and outlet means for directing the heated liquid or vapor from said pressure accumulator means.

4. A system in accordance with claim 3 including third conduit means in fluid communication between the outlet means of said pressure accumulator means and an inlet means of a digester for directing the heated liquid from said pressure accumulator means to the digester.

5. A system in accordance with claim 3 including accumulator outlet conduit means in fluid communication between said outlet means of said pressure accumulator means and a mechanism to be heated by vapor from said pressure accumulator means for directing the vapor from said pressure accumulator means to the mechanism.

6. A system in accordance with claim 5 wherein a compressor is disposed in said accumulator outlet conduit means to further compress the vapor for use in the mechanism.

7. A system in accordance with claim 1 including pressure relief conduit means in fluid communication between said container means and said second conduit means, and pressure relief valve means for directing flash vapor above a second predetermined pressure, which is above said first predetermined pressure a selected amount, through said pressure relief conduit means to said second conduit means.

8. A system in accordance with claim 1 or 2 including circulation means disposed between said pressure accumulator means and a portion of first conduit means upstream of the inlet to said pressure accumulator means for circulating a portion of said processing liquid to said portion of said first conduit means to condense said flash vapor with said processing liquid.

9. A system in accordance with claim 8 including a eductor in said portion of said first conduit means.

10. A system in accordance with claim 8 including second pressure accumulator means in fluid communication with said first conduit means downstream of said first pressure accumulator means for receiving flash vapor from said container means below the first predetermined pressure but above a second predetermined pressure and for holding a second processing liquid into which the flash vapor is to be condensed at a pressure above atmospheric;

second valve means disposed between said first and second conduit means downstream of said first valve means; and second pressure control means for opening and closing said second valve means, said second pressure control means responsive to the pressure in said container means at or above the second predetermined pressure for closing said second valve means and directing the flash vapor to said second pressure accumulator means, said second pressure control means responsive to the pressure in said container means below the second predetermined pressure for opening said second valve means and directing the flash vapor to the atmospheric accumulator.

11. A system in accordance with claim 1 wherein said container means is a blow cyclone.

12. A system in accordance with claim 1 wherein said container means is a blow tank.

* * * * *

UNITED STATES PATENT AND TRADEMARK OFFICE
CERTIFICATE OF CORRECTION

PATENT NO. : 4,568,422

DATED : February 4, 1986

INVENTOR(S) : A. Douglas Armstrong, Vernon B. Bodenheimer and Tom O. Rytter

It is certified that error appears in the above-identified patent and that said Letters Patent is hereby corrected as shown below:

Claim 10, column 7, line 24, change "8" to —1—.

Signed and Sealed this

Thirteenth Day of May 1986

[SEAL]

Attest:

DONALD J. QUIGG

Attesting Officer

Commissioner of Patents and Trademarks